(12) United States Patent
Gloeckler et al.

(10) Patent No.: US 9,616,846 B2
(45) Date of Patent: Apr. 11, 2017

(54) BELT RETRACTOR

(71) Applicant: Takata AG, Aschaffenburg (DE)

(72) Inventors: Oliver Gloeckler, Nersingen (DE);
Wolfgang Schrade, Westerheim (DE);
Peter Linde, Blaustein (DE); Uwe Eisemann, Blaustein (DE); Armin Toth, Dornstadt (DE)

(73) Assignee: TAKATA AG, Aschaffenburg (DE)

( * ) Notice: Subject to any disclaimer, the term of this patent is extended or adjusted under 35 U.S.C. 154(b) by 154 days.

(21) Appl. No.: 14/666,987

(22) Filed: Mar. 24, 2015

(65) Prior Publication Data

US 2015/0298650 A1    Oct. 22, 2015

(30) Foreign Application Priority Data

Apr. 22, 2014    (DE) .................. 10 2014 207 590

(51) Int. Cl.
*B60R 22/28* (2006.01)
*B60R 22/46* (2006.01)
*B60R 22/34* (2006.01)

(52) U.S. Cl.
CPC ........ *B60R 22/4633* (2013.01); *B60R 22/341* (2013.01); *B60R 2022/287* (2013.01)

(58) Field of Classification Search
CPC ... B60R 22/28; B60R 22/341; B60R 22/4633; B60R 2022/287
See application file for complete search history.

(56) References Cited

U.S. PATENT DOCUMENTS

| 6,250,579 | B1 * | 6/2001 | Bannert | B60R 22/3413 242/379.1 |
|---|---|---|---|---|
| 6,435,441 | B1 | 8/2002 | Kajiyama et al. | |
| 6,648,260 | B2 | 11/2003 | Webber et al. | |
| 2003/0019969 | A1 * | 1/2003 | Webber | B60R 22/3413 242/379.1 |
| 2009/0039634 | A1 * | 2/2009 | Krauss | B60R 22/4633 280/806 |
| 2010/0301152 | A1 * | 12/2010 | Fleischmann | B60R 22/38 242/379.1 |

FOREIGN PATENT DOCUMENTS

| DE | 10 2004 07 687 A1 | 9/2005 |
|---|---|---|
| DE | 10 2013 217 018 A1 | 10/2013 |
| EP | 0 913 300 A1 | 5/1999 |
| EP | 1 443 296 A1 | 8/2004 |
| JP | 55-152903 A | 11/1980 |
| WO | WO-00/70231 | 11/2000 |

\* cited by examiner

*Primary Examiner* — Sang Kim
(74) *Attorney, Agent, or Firm* — Gordon & Rees LLP

(57) ABSTRACT

The invention relates to a belt retractor for a seat belt having a belt reel for winding up and unwinding the seat belt and a torsion bar which is arranged outside the belt reel and is connected at one bar end to a switchable fixing device. The switchable fixing device keeps the bar end rotationally fixed in one state and permits rotation of the bar end in another state. The switchable fixing device has a displaceable piston which, with a piston portion, in a locking position, can secure the bar end against rotation and, in a release position displaced in relation to the locking position, releases the bar end.

14 Claims, 14 Drawing Sheets

BELT RETRACTOR

Figure 1:
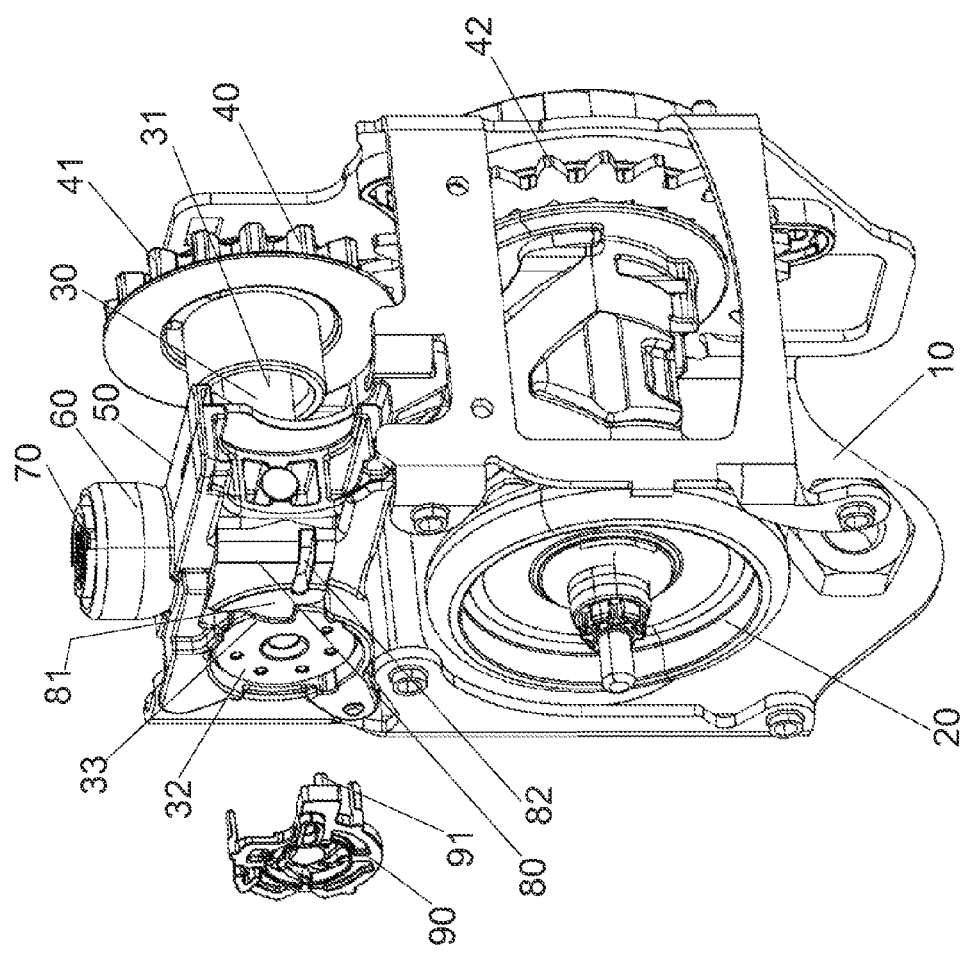

The invention relates to a belt retractor for a seat belt with the features according to the preamble of patent claim 1.

A belt retractor of this type is known from European Patent Application EP 0 913 300 A1. The previously known belt retractor is provided with a belt reel for winding up and unwinding a seat belt, and a torsion bar which is arranged outside the belt reel and is connected at one bar end to a switchable fixing device. The switchable fixing device, in one state, keeps the bar end rotationally fixed and, in another state, permits rotation of the bar end.

The invention is based on the object of specifying a belt retractor which has a structurally particularly space-saving fixing device.

This object is achieved according to the invention by a belt retractor with the features according to patent claim 1. Advantageous refinements of the belt retractor according to the invention are specified in dependent claims.

According thereto, it is provided according to the invention that the switchable fixing device has a displaceable piston which, with a piston portion, in a locking position, can secure the bar end against rotation and, in a release position displaced in relation to the locking position, releases the bar end.

A substantial advantage of the belt retractor according to the invention can be seen in that deactivation of the switchable fixing device is possible solely by a displacement of a piston, i.e. solely by an axial or translatory movement. By means of this refinement of the fixing device, a particularly compact construction of the belt retractor can be achieved in an advantageous manner.

It is considered to be particularly advantageous if the fixing device has a gas generator, for example in the form of a pyrotechnic igniter, which, when activated, generates gas and, by means of the gas pressure, moves the piston in a translatory or axial manner along a longitudinal axis of the piston from the locking position into the release position.

The switchable fixing device preferably has a housing with an internal gas duct which connects two housing openings in the housing to each other and is rectilinear in portions. Preferably the entire piston or at least an inner piston portion of the piston is guided axially in the rectilinear portion of the gas duct. After the gas generator is activated, the gas of the gas generator is preferably conducted in the direction of the piston, and the piston is preferably moved exclusively in a translatory manner in the rectilinear portion of the gas duct.

The gas generator is preferably inserted into one of the two housing openings mentioned. The piston can be entirely or partially pushed out of the housing through the other of the two housing openings mentioned.

With regard to prefixing the piston, it is considered to be advantageous if in an outer piston portion located outside the housing the piston has a slot-like depression or a slot-like hole in which—in the locking position of the piston—a locking pin engages, said locking pin blocking or at least limiting an axial displacement of the piston in the direction of the release position. The locking pin is preferably dimensioned in such a manner that, when the gas generator is activated, said locking pin is sheared off by the piston.

The locking pin is preferably integrally formed on a positioning element which resiliently fixes the position of the axis of rotation of the torsion bar in the region of the bar end and permits a slight resilient deflection of the axis of rotation of the torsion bar. The positioning element serves as a type of protection against rattling for that bar end of the torsion bar which cooperates with the fixing device.

The positioning element is preferably funnel-shaped or helical. That bar end of the torsion bar which cooperates with the fixing device is preferably arranged in the region of the center of the positioning element.

It is also advantageous if a spring element is attached or is integrally formed in one piece to or on or in the housing, said spring element blocking or at least impeding a displacement of the piston in the axial direction from the locking position into the release position before the gas generator is activated.

The piston preferably has, between the side facing the gas generator and the side facing away from the gas generator—in particular in the region of the piston portion which is located within the housing in the locking position or inner piston portion—a depression in which, after the release position of the piston is reached, a spring element, for example the spring element already mentioned or another spring element, engages in such a manner that the return movement of the piston from the release position into the locking position is prevented.

With regard to the depression, it is considered to be advantageous if said depression is ramp-shaped and has a steep and a gentle flank. The gentle flank preferably lies closer to the gas generator than the steep flank. The gentle flank preferably at least slightly brakes the piston movement in the forward direction; the steep flank preferably prevents a backwards movement of the piston.

With regard to the configuration of the housing, it is considered to be advantageous if the housing has a housing opening through which, when the gas generator is activated, the piston or at least the inner piston portion is at least partially pushed axially out of the housing. A deformable edge portion of the housing is preferably arranged in the region of the housing opening, said edge portion projecting into the housing opening, operating as a spring element and blocking or impeding a displacement of the piston in the axial direction from the locking position into the release position before the gas generator is activated and, after movement of the piston, preventing a return movement of the piston.

A seal which seals the piston in relation to the housing is preferably attached on that piston side of the piston which faces the gas generator. The piston is preferably composed of metal or plastic and the seal preferably of rubber or plastic. In the case of a plastics piston, the seal is preferably integrated in the piston or is in one piece therewith. The seal can be injection molded onto the piston, for example, within the context of an injection molding process.

The piston portion (also called engagement portion below), which, in the locking position of the piston, secures the bar end of the torsion bar against rotation and, in a release position displaced in relation to the locking position, releases the bar end, can be integrally formed in one piece on the piston or can be formed by a portion connected in one piece to the remaining piston region (also called piston basic body below). Alternatively, the engagement portion can be formed by a separate part which is attached to the piston basic body, preferably by an interlocking, frictional or integrally bonded connection.

In the case of the last-mentioned variant, it is considered to be particularly advantageous if the engagement portion is formed by an insert part, preferably a metal insert part, which is connected by an interlocking and/or frictional connection to a piston basic body made of plastic. An interlocking portion of the insert part is preferably pushed into a recess of the piston basic body, specifically along a sliding direction which is perpendicular to the translatory direction of movement of the piston basic body after the gas generator is triggered.

That bar end of the torsion bar which cooperates with the fixing device preferably has an interlocking connection portion in which a complementary interlocking connection portion of the piston engages in the locking position and from which the complementary interlocking connecting portion of the piston is separated in the release position. The interlocking connection portion is preferably attached to or integrally formed in one piece on the bar end.

It is considered to be advantageous if the interlocking connection portion of the bar end has a depression or is formed by such a depression, and the complementary interlocking connection portion of the piston has a lug-shaped (or nose-shaped) projection formed in a complementary manner with respect to the depression, or is formed by such a projection.

Alternatively, the interlocking connection portion of the bar end can be formed by a toothing and the complementary interlocking connection portion can be formed by a complementary toothing or can have such toothings.

Figure 2:
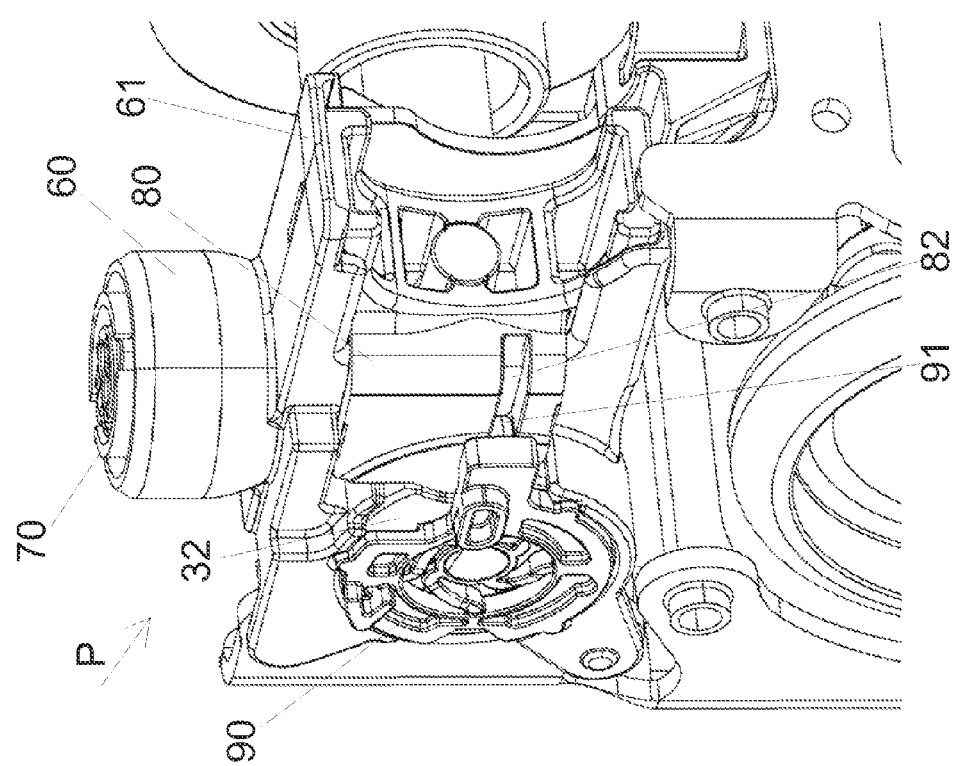
Figure 3:
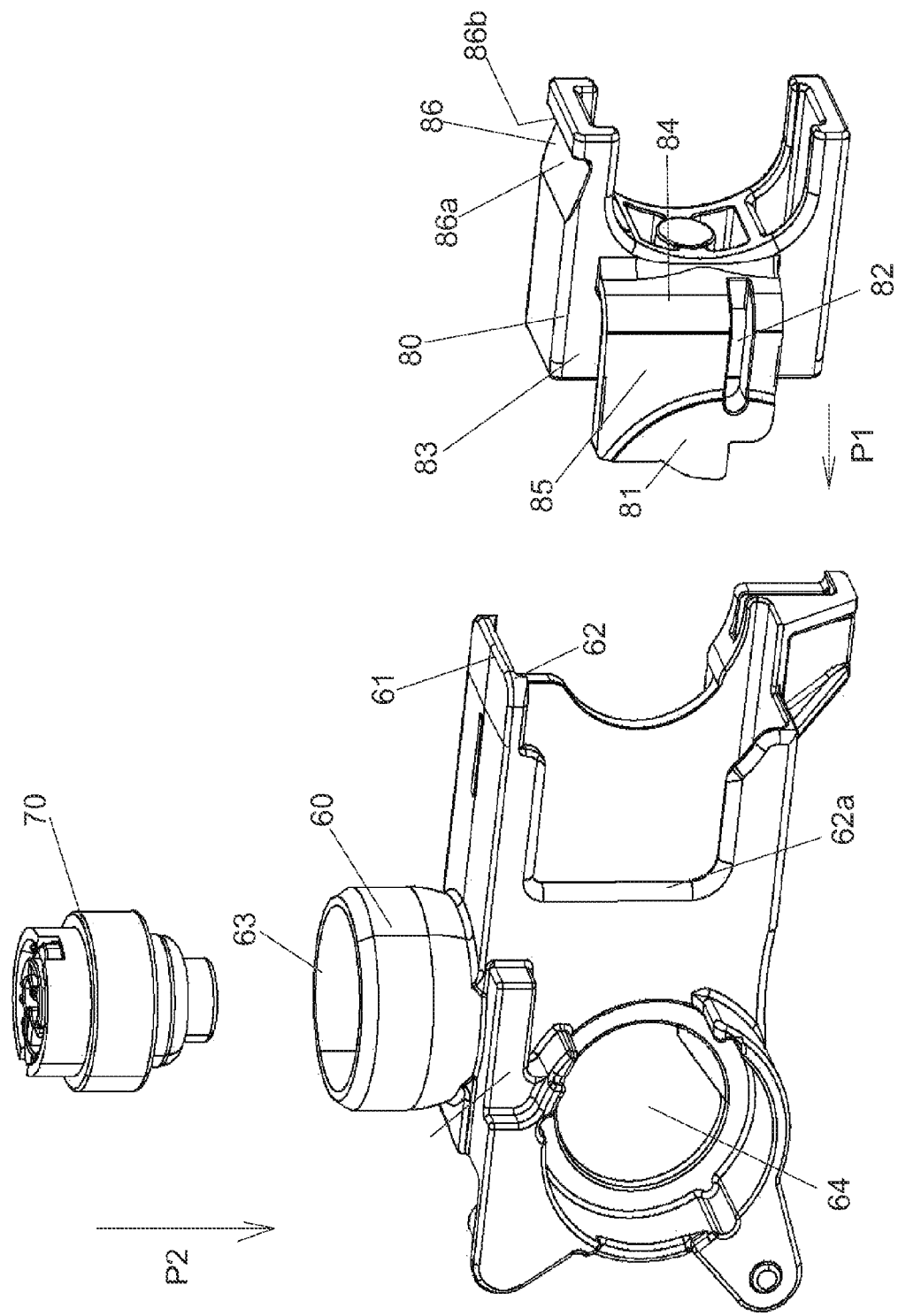
Figure 4:
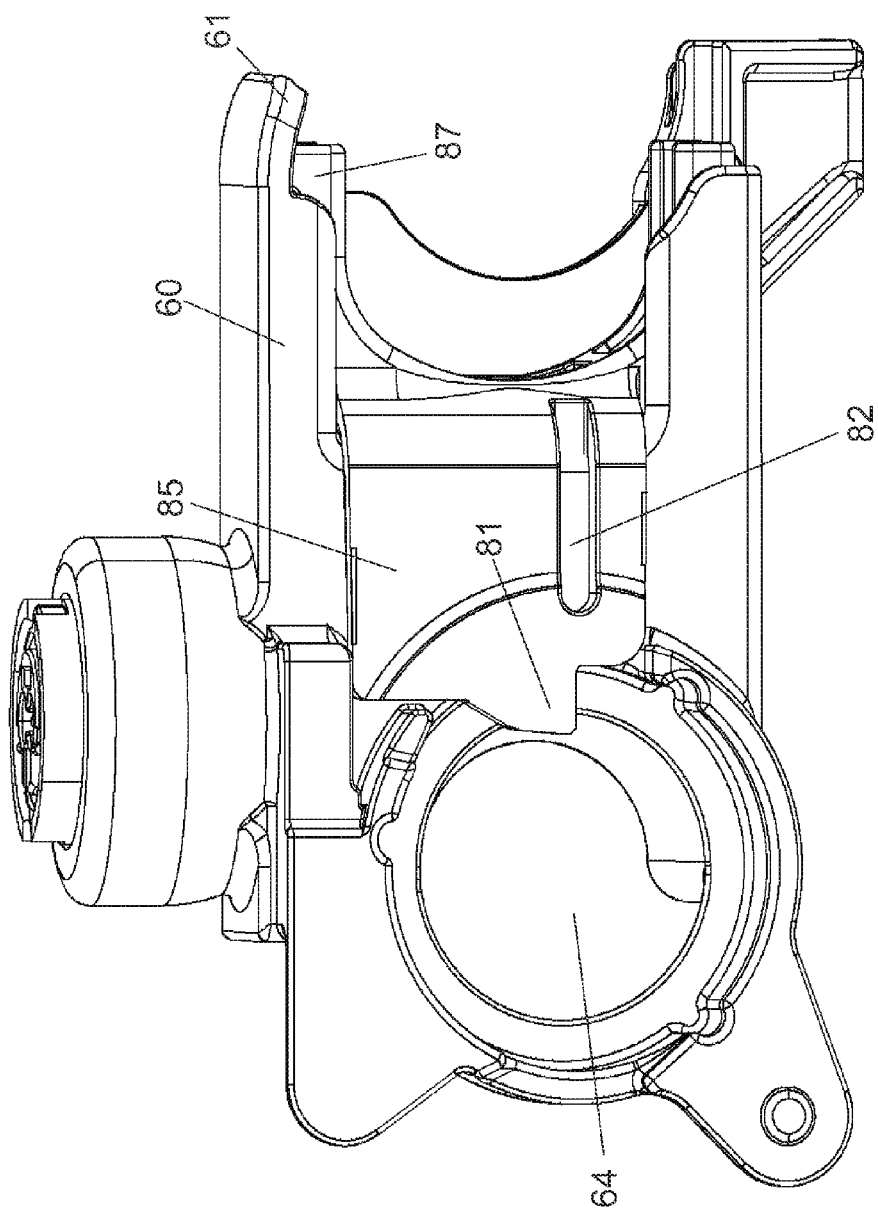
Figure 6:
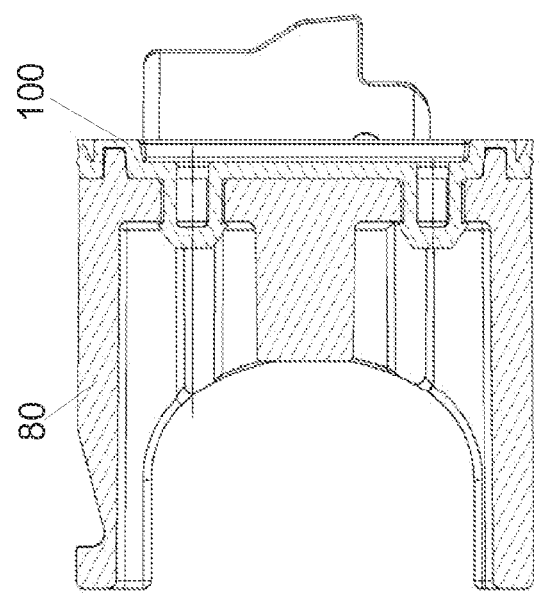
Figure 5:
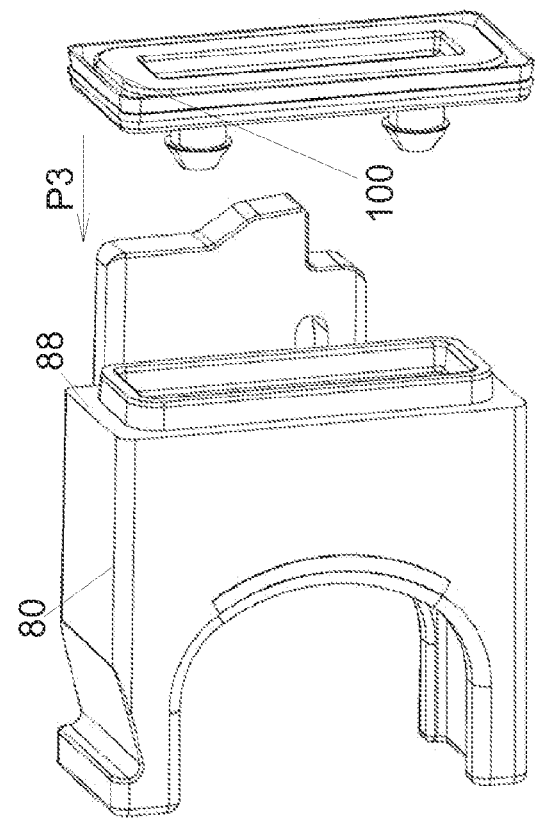
Figure 7:
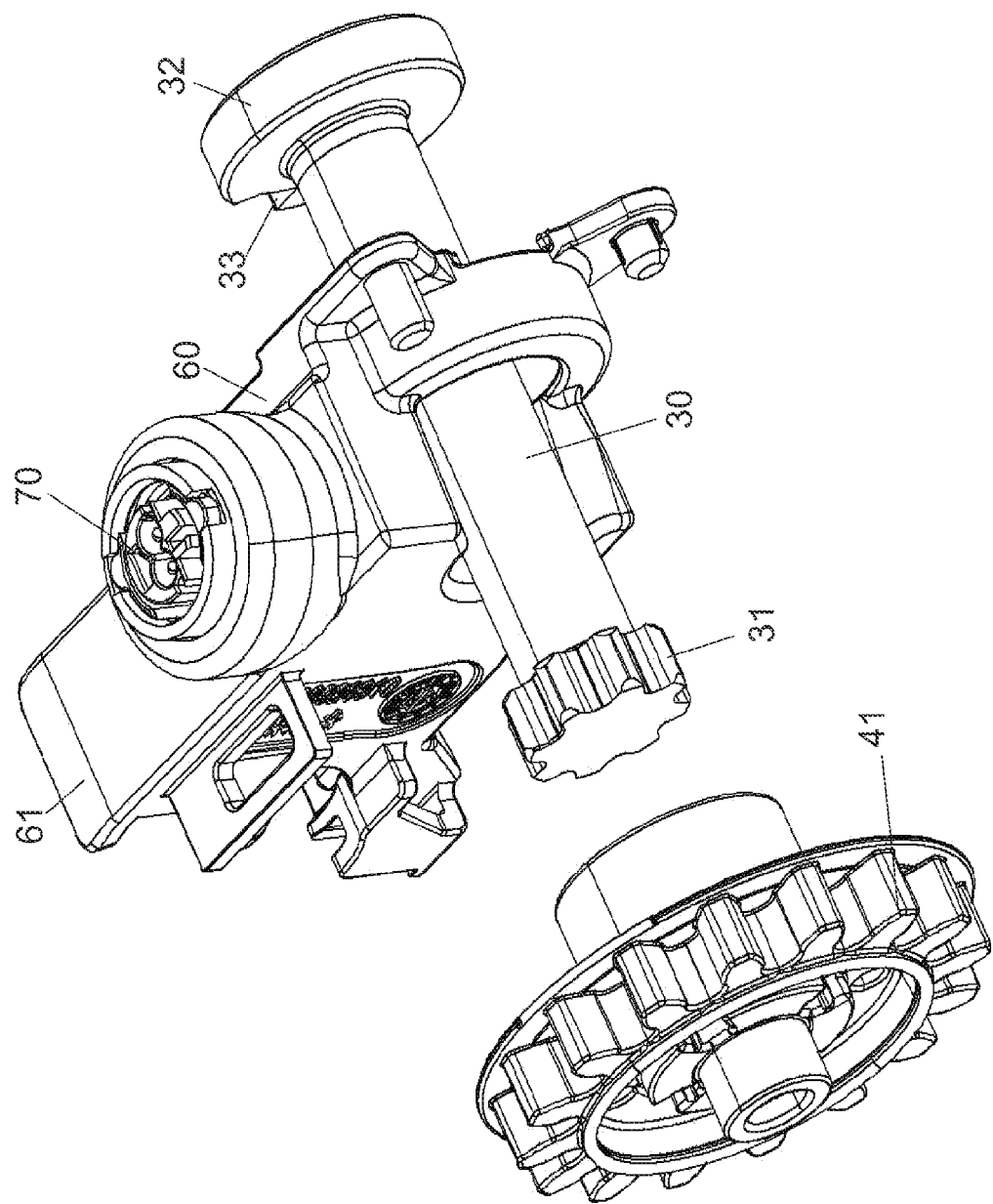
Figure 8:
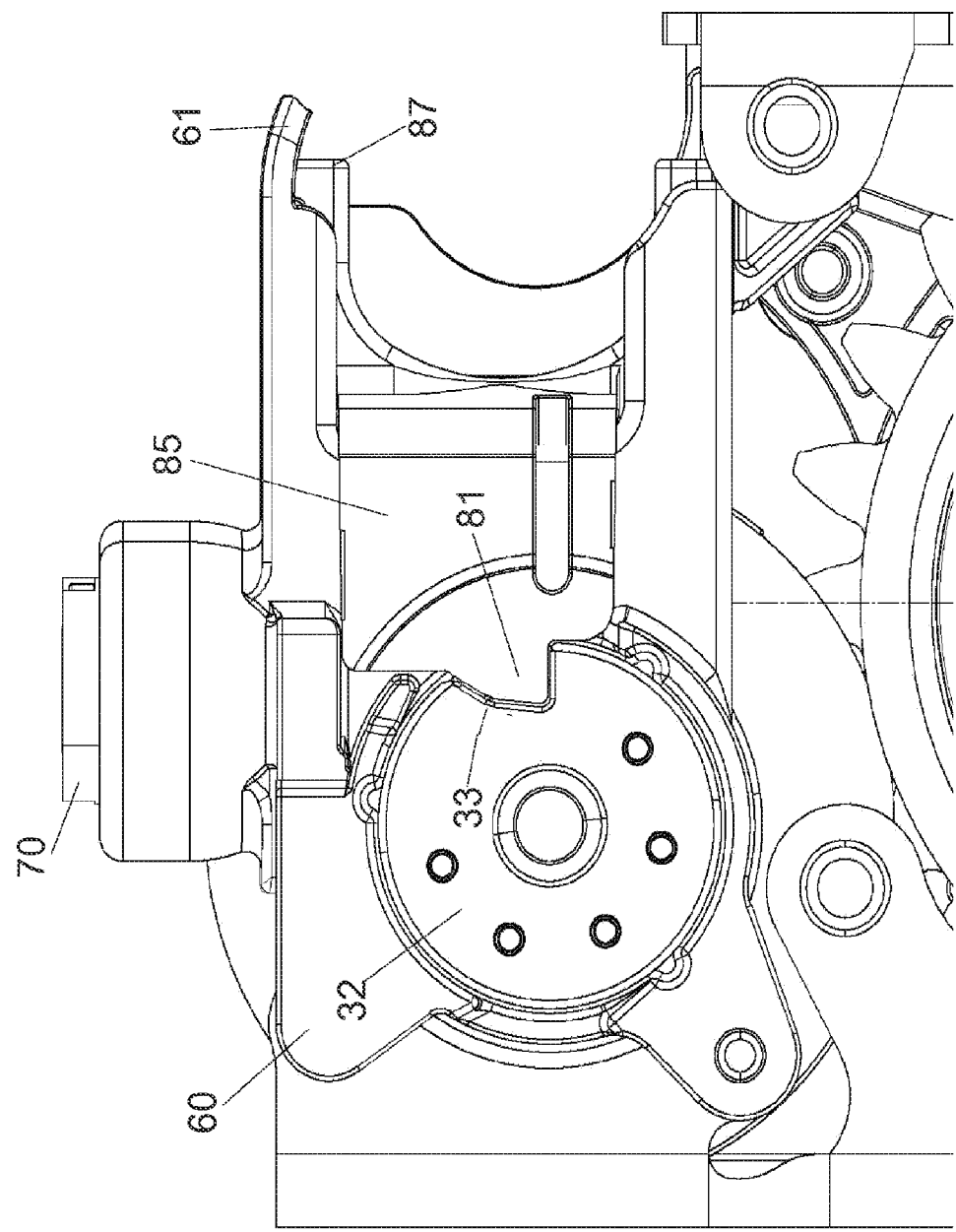
Figure 9:
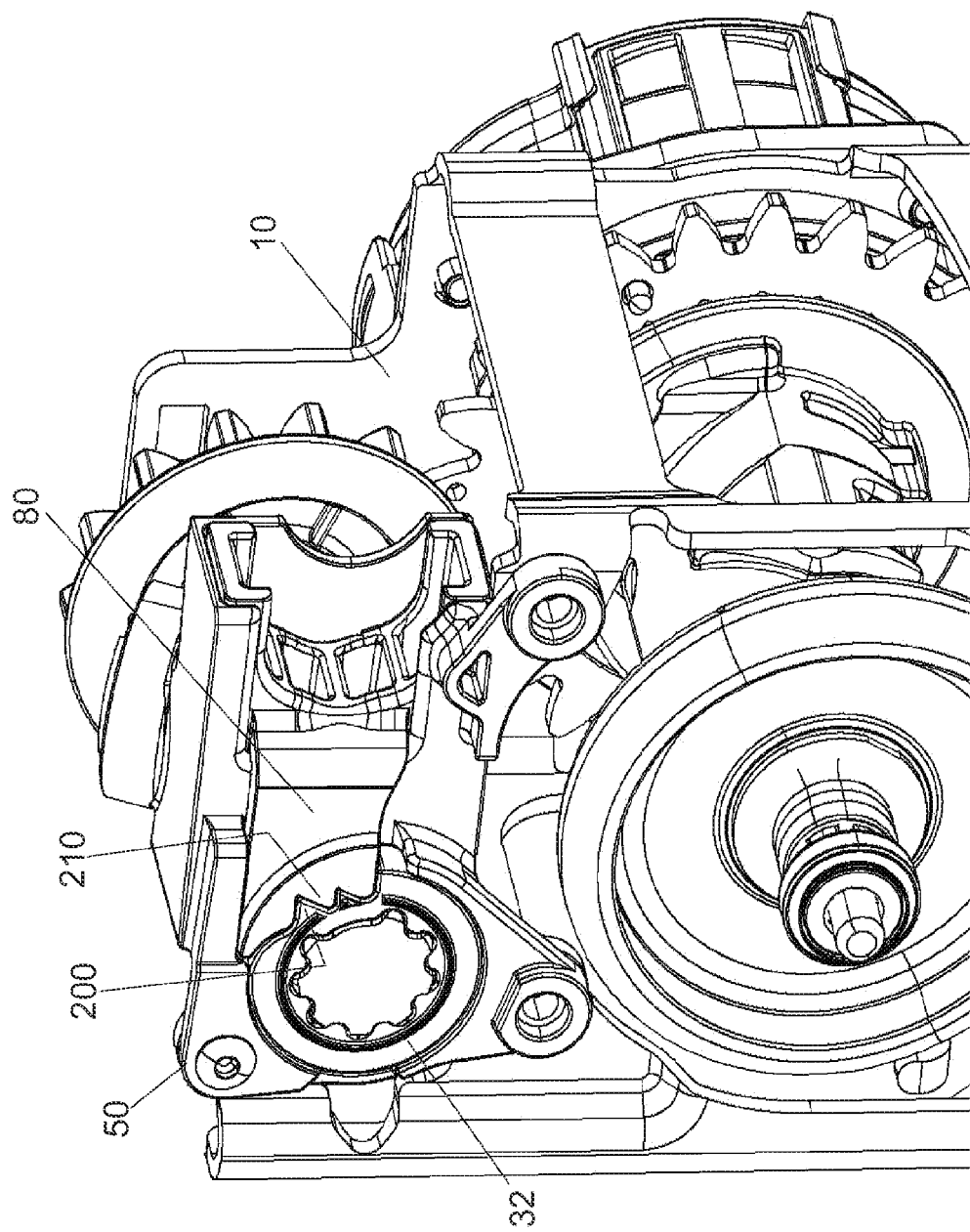
Figure 10:
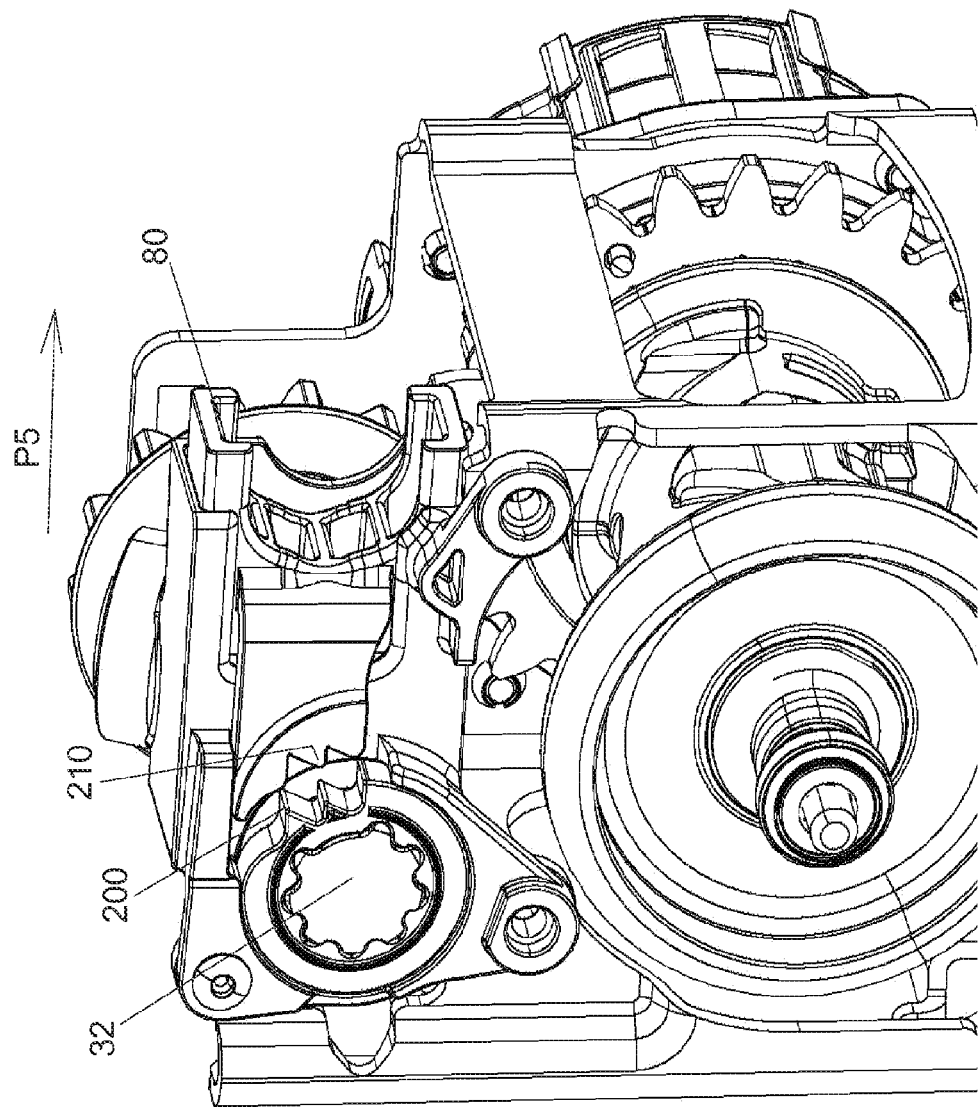
Figure 11:
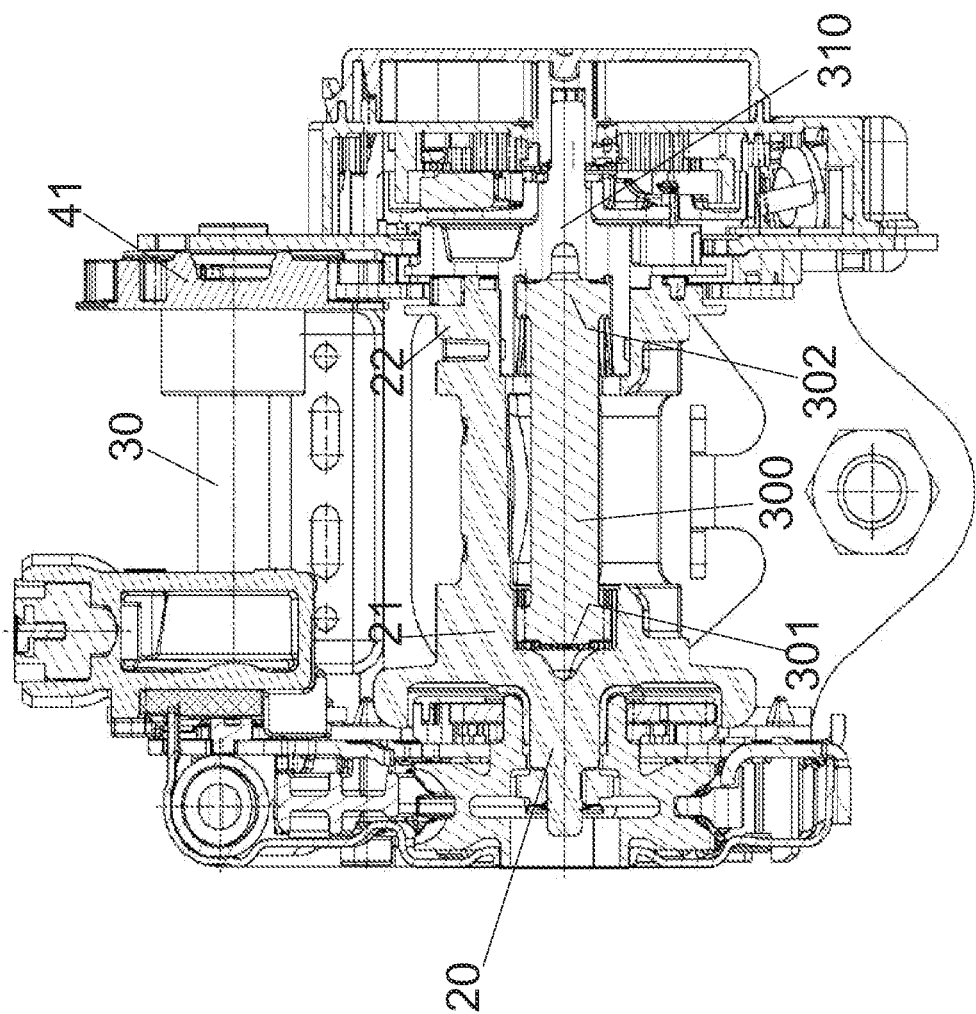
Figure 12:
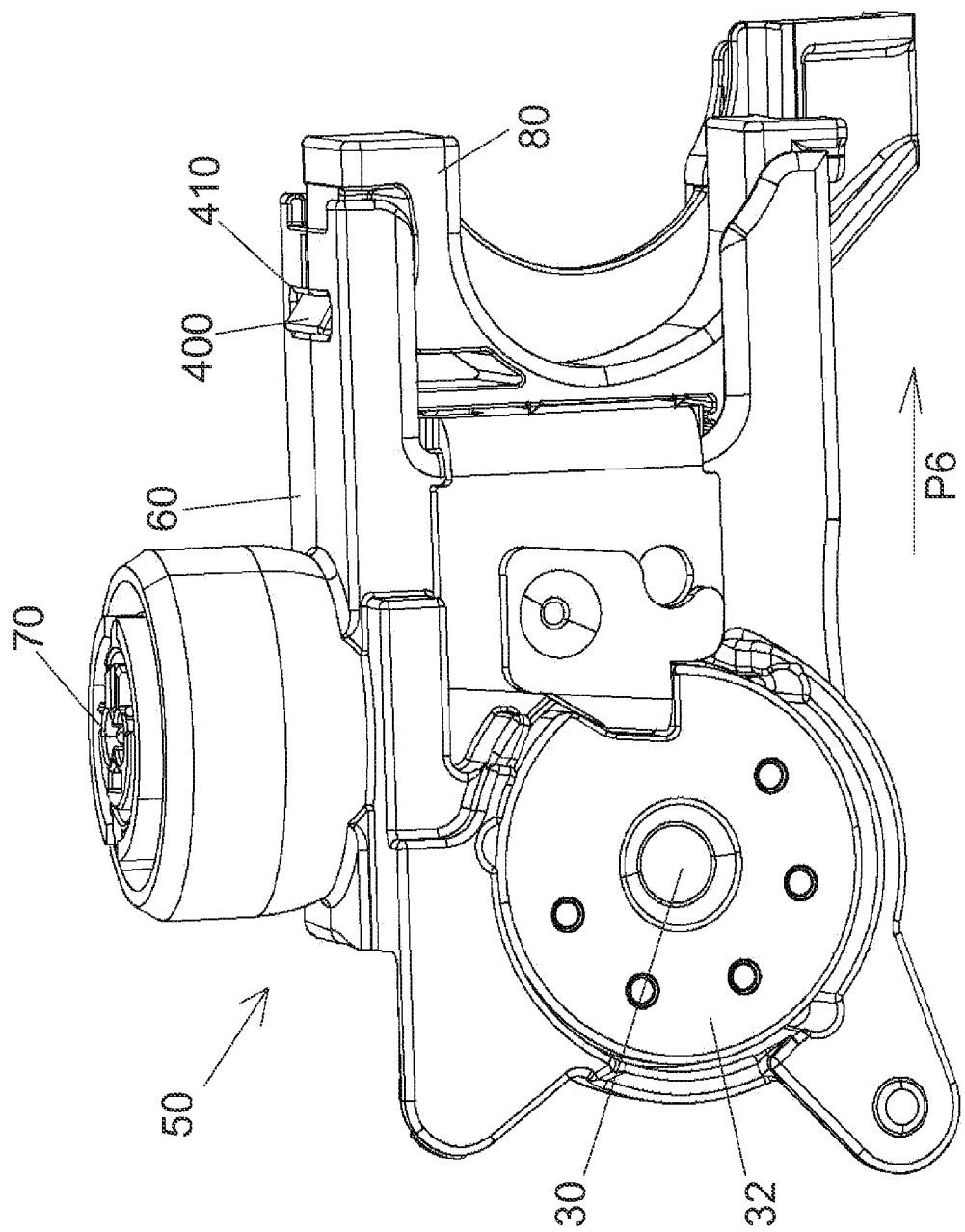
Figure 13:
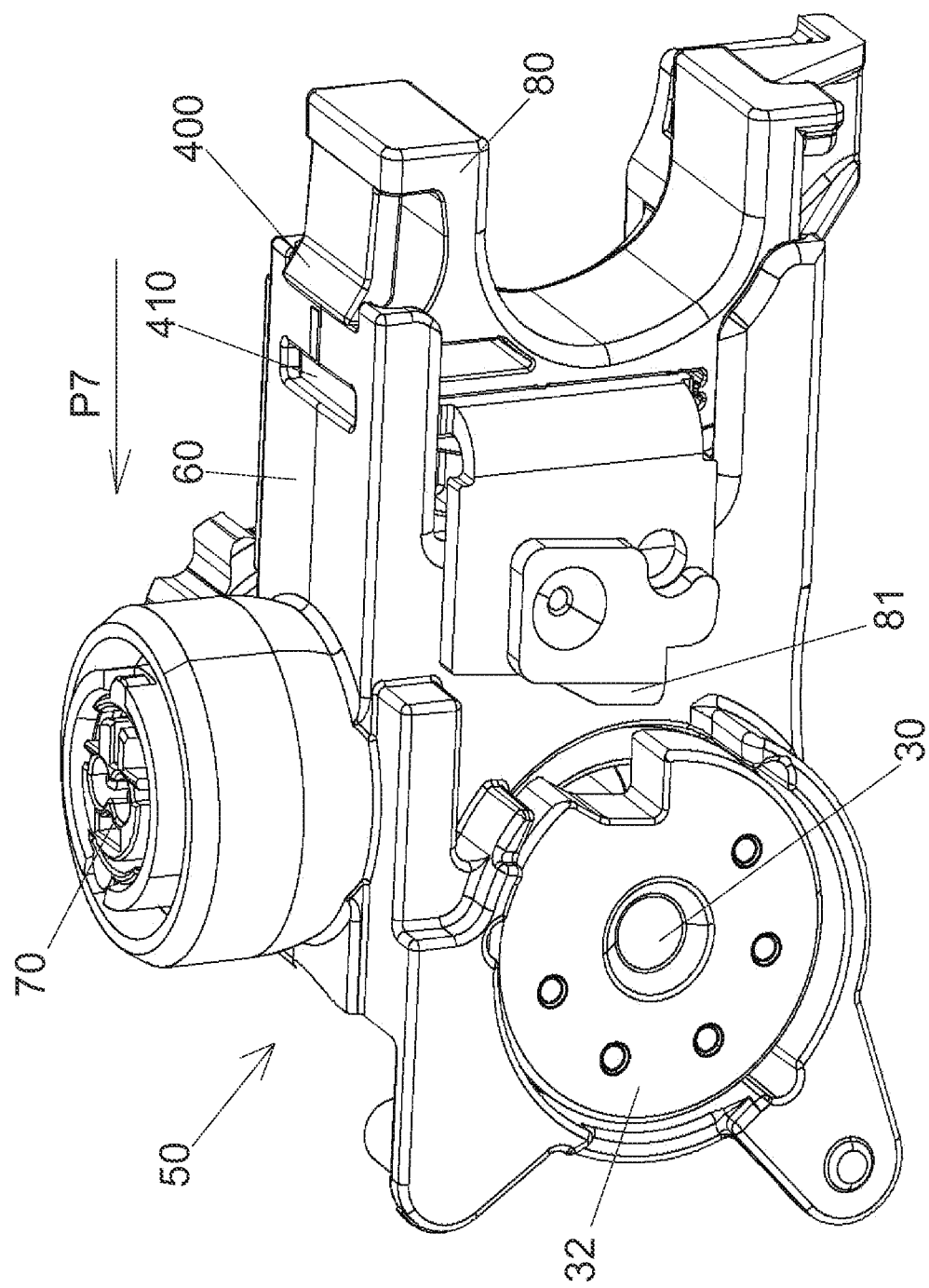
Figure 14:
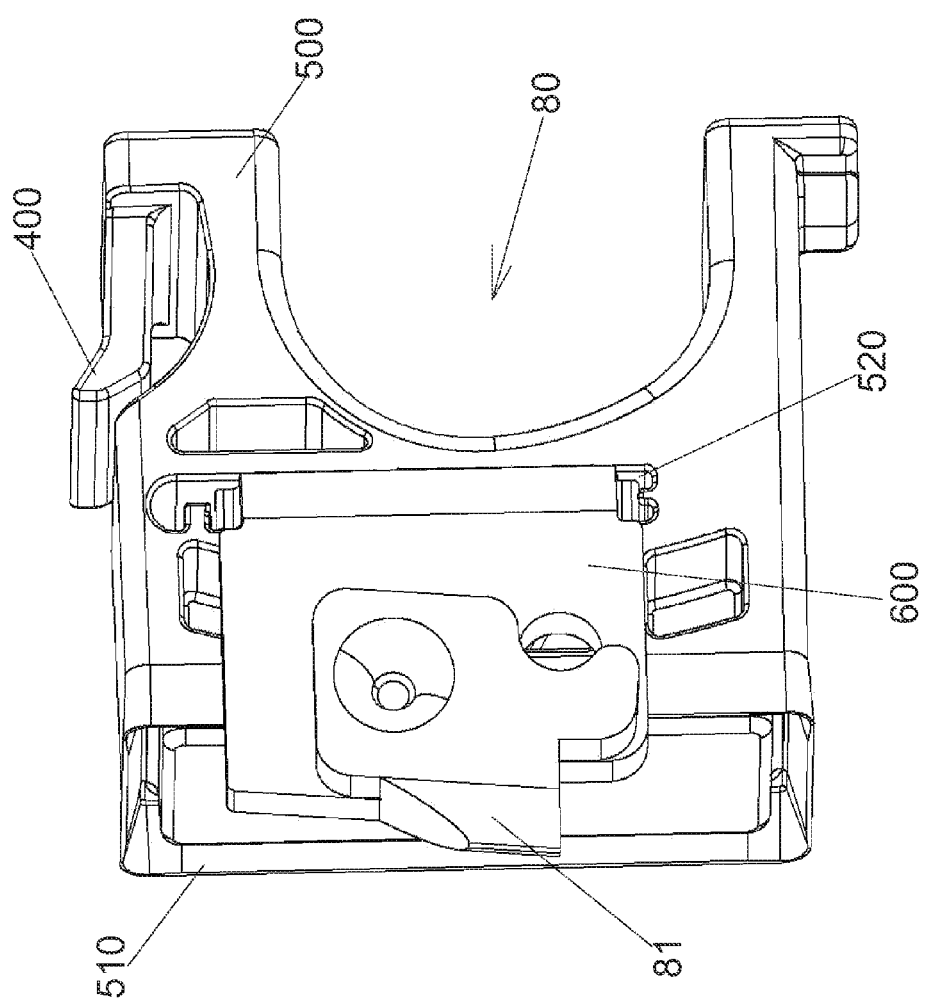
Figure 16:
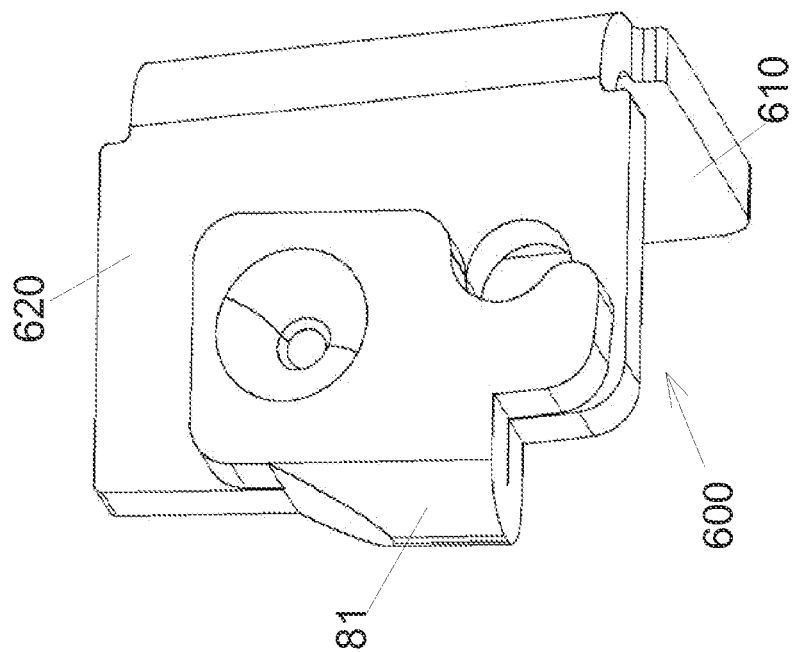
Figure 15:
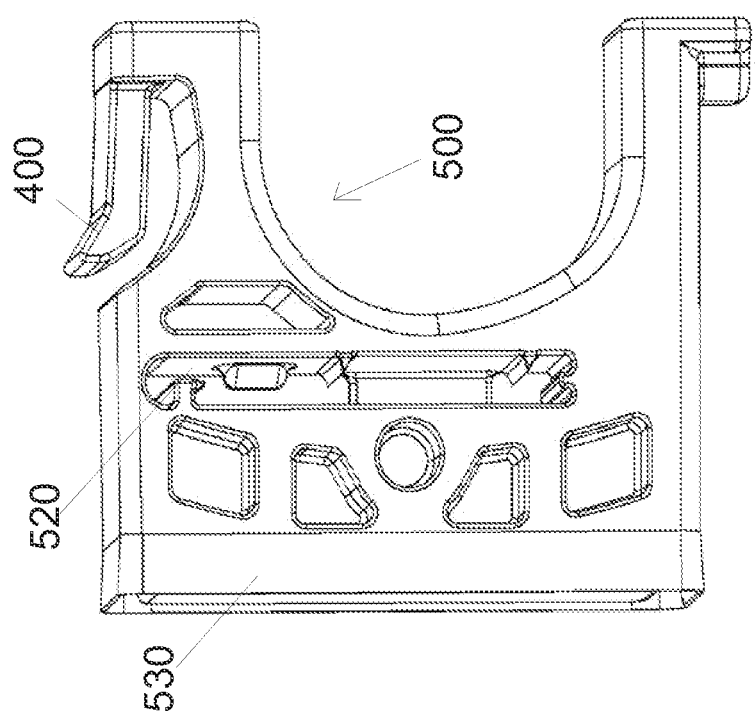

The invention is explained in more detail below with reference to exemplary embodiments, in which, by way of example FIGS. 1 and 11 show components of a first exemplary embodiment of a belt retractor according to the invention in a partial exploded illustration and in a cross section, FIG. 2 shows the components of the belt retractor according to FIG. 1 in the mounted state, FIG. 3 shows the mounting of the components of a fixing device for the belt retractor according to FIGS. 1 and 2 in a three-dimensional illustration, FIG. 4 shows the fixing device according to FIG. 3 in the mounted state, FIG. 5 shows a piston of the fixing device according to FIGS. 3 and 4 before an additional seal is attached, FIG. 6 shows, in cross section, the piston and the seal according to FIG. 5 after the seal is mounted, FIG. 7 shows the insertion of a torsion bar into the fixing device according to FIGS. 3 and 4 in an exploded illustration, FIG. 8 shows the fixing device according to FIGS. 3, 4 and 7 after the torsion bar has been inserted and positioned, in a view from the front, FIG. 9 shows a second exemplary embodiment for a belt retractor according to the invention with a fixing device before a gas generator is triggered, FIG. 10 shows the belt retractor according to FIG. 9 after the gas generator has been triggered and an outer torsion bar of the belt retractor has been released, FIG. 12 shows a further exemplary embodiment of a fixing device which can be used in the case of the belt retractor according to FIGS. 1 and 11, wherein FIG. 11 shows the locking position of the fixing device, FIG. 13 shows the fixing device according to FIG. 12 in the release position, FIG. 14 shows the piston of the fixing device according to FIGS. 12 and 13 more specifically in detail, FIG. 15 shows a piston basic body of the piston according to FIG. 14 more specifically in detail, and FIG. 16 shows an insert part of the piston according to FIG. 14 more specifically in detail.

For the sake of clarity, the same reference signs are always used for identical or comparable components in the figures.

FIG. 1 shows components of a belt retractor 10 which is provided with a belt reel 20 and a torsion bar 30 which is located outside the belt reel 20 or outer torsion bar 30. FIG. 11 shows the belt retractor 10 in cross section.

A first bar end 31 of the torsion bar 30, which end is on the right in FIGS. 1 and 11, is connected to the belt reel 20 via a gearing 40 and via a pawl mechanism (not shown). In the exemplary embodiment according to FIG. 1, the gearing 40 has a gearwheel 41 connected to the torsion bar 30 for rotation therewith, and a further gearwheel 42 which is connectable to the right side of the belt reel 20 via the pawl mechanism (not shown). The two gearwheels 41 and 42 are in engagement with each other; during normal operation, the further gearwheel 42 and the belt reel are separated from each other by the pawl mechanism, and therefore the belt reel 20 can rotate freely in relation to the further gearwheel 42.

FIG. 11 also shows an inner torsion bar 300 which is arranged within the belt reel 20 and the left end 301 of which is fixedly connected to the left end 21 of the belt reel and the right end 302 of which is connected to a locking base 310 of the belt retractor 10.

If an abrupt extension of the belt strap occurs, the locking base 310 (cf. FIG. 11) is locked to the frame of the belt retractor 10, and therefore the locking base 310 and the right end 302 of the inner torsion bar 300 can no longer rotate. A further extension of the belt strap and further rotation of the belt reel 20 are therefore possible only by torsion of the torsion bar 300. If the belt reel 20 rotates further by torsion of the torsion bar 300, then, owing to the relative rotation between the locking base 310 and the belt reel 20, the pawl mechanism which has already been mentioned is activated and a connection between the right end 22 of the belt reel 20 and the further gearwheel 42 is produced. Since the further gearwheel 42 is permanently connected to the gearwheel 41 and to the outer torsion bar 30, upon further extension of the belt strap the outer torsion bar 30 is also twisted because a flange portion of the second bar end 32 of the outer torsion bar 30, which end is on the left in FIGS. 1 and 11, is still blocked in this first phase by a fixing device 50. In the first phase, the belt strap extension force or belt strap retaining force is therefore produced by the sum of the torsional forces of the inner torsion bar 300 and of the outer torsion bar 30.

If the belt strap extension force or belt strap retaining force is intended to be reduced during the extension of the belt strap (so to say in a second phase), the fixing device 50 is deactivated and the flange portion of the second end 32 of the outer torsion bar 30 released, and therefore the outer torsion bar 30 can freely rotate. As soon as the outer torsion bar 30 can freely rotate, it is no longer twisted and does not lead to any further belt retaining force. The belt retaining force is subsequently determined solely by the inner torsion bar 300.

In order to permit the described operation, the flange portion of the second end 32 of the torsion bar 30 is preferably provided with an interlocking connection portion in the form of a depression 33 which interacts with the fixing device 50 of the belt retractor 10.

The fixing device 50 has a housing 60 which bears or accommodates a gas generator 70. Furthermore, the housing 60 serves to mount a piston 80 of the fixing device 50 displaceably in an axial or translatory manner.

In the illustration according to FIG. 1, the piston 80 is in a locking position in which the piston or a piston portion of the piston engages in the depression 33 or in the flange portion of the torsion bar 30 and therefore secures the latter against rotation. In the exemplary embodiment according to FIG. 1, the piston portion engaging in the depression 33 is formed by a lug-shaped (or nose-shaped) projection which is identified by the reference sign 81.

Furthermore, FIG. 1 shows a positioning element 90 which is fitted within the scope of the mounting onto the belt retractor 10 or onto the flange portion of the second end 32 of the torsion bar 30. The positioning element 90 has a locking pin 91 which is inserted into a slot-like or slot-shaped hole 82 in the piston 80.

FIG. 2 shows the belt retractor 10 and the components thereof more specifically in detail after the positioning element 90 is attached. It can be seen that the locking pin 91 engages in the slot-like hole 82 of the piston 80 and therefore prevents a displacement of the piston 80 along the arrow direction P in FIG. 2. A movement of the piston 80 along the arrow direction P is possible only if the locking pin 91 is broken off or sheared off.

FIG. 2 furthermore shows the configuration of the positioning element 90 more specifically in detail. It can be seen that the positioning element is of funnel-shaped or helical configuration and serves to resiliently hold the second end 32 of the torsion bar in the region of the center of the positioning element 90 and to avoid rattling.

The positioning element 90 therefore has a dual function: firstly, the positioning element serves to hold the second bar end 32 of the torsion bar 30 in relation to other components of the belt retractor 10 in a manner free from rattling, and therefore the second bar end 32 cannot cause any annoying noises before the gas generator 70 is triggered; secondly, the positioning element 90 serves to engage by means of the locking pin 91 in the slot-like hole 82 in the piston and to hold the piston 80 in the position illustrated in FIGS. 1 and 2 before the gas generator 70 is triggered.

Furthermore, a spring element 61 can be seen in FIG. 2, said spring element being attached to the housing 60 or—as in the exemplary embodiment according to FIG. 2—being integrally formed in one piece thereon and serving to prevent the piston 80 from sliding out of the locking position illustrated in FIGS. 1 and 2. It can thus be seen that the spring element 61 rests on the outer edge of the piston 80, and therefore the latter can only be moved out of the housing 60 when the spring element 61 is pushed away or bent away.

The spring element 61 therefore supplements the locking pin 91 with regard to the positioning of the piston 80 in the housing 60 before the gas generator 70 is triggered, said locking pin likewise ensuring that the piston 80 is secured—as already explained.

FIG. 3 shows, by way of example, more specifically in detail how the fixing device 50 according to FIGS. 1 and 2 can be mounted. It is seen in FIG. 3 that the housing 60 has two housing openings 62 and 63 which are connected to each other in terms of gas flow and form an internal gas duct. The two housing openings 62 and 63 are separated in terms of gas flow from a passage opening 64 which extends through the housing 60 and serves for receiving the second bar end 32 (cf. FIGS. 1 and 2) of the torsion bar 30. The plane of the passage opening 64 is preferably parallel to the plane of the gas duct between the two housing openings 62 and 63.

The piston 80 is pushed axially along the arrow direction P1 into the housing opening 62, as a result of which an inner piston portion 83 is positioned in a rectilinear portion of the gas duct between the two housing openings 62 and 63.

The inner piston portion 83 is connected to an outer piston portion 85 of the piston 80 via a connecting portion 84 which rests on an edge 62a of the housing opening 62. The lug-shaped projection 81 and the slot-like hole 82, the function of which has already been explained in conjunction with FIGS. 1 and 2, are arranged on the outer piston portion 85.

By the piston 80 being pushed along the arrow direction P1 into the housing opening 62, the lug-shaped projection 81 is positioned in the region of the passage opening 64, and therefore said projection can enter into engagement with the second bar end 32 or the depression 33 in the torsion bar (cf. FIG. 1).

In addition, the gas generator 70 is positioned on or in the housing 60 by said gas generator being introduced into the housing opening 63 in accordance with the arrow direction P2.

FIG. 3 furthermore shows the configuration of the piston 80 more specifically in detail. A ramp-shaped depression 86 which has a gentle flank 86a and a steep flank 86b is seen. The gentle flank 86a of the ramp-shaped depression 86 lies closer to the gas generator 70 than the steep flank 86b; accordingly, the steep flank 86b of the ramp-shaped depression 86 lies closer to the housing opening 62. The function of the ramp-shaped depression 86 consists in interacting with the spring element 61 of the housing 60, as is also explained in more detail in conjunction with FIG. 4.

The spring element 61 of the housing 60 is preferably first of all bent in the direction of the piston 80 and is bent around the outer edge 87 of the piston 80 after the piston 80 has been introduced along the arrow direction P1 into the housing 60.

FIG. 4 shows the mounted fixing device 50 more specifically in detail. It can be seen that the ramp-shaped depression 86 lies in the interior of the housing and the spring element 61 rests resiliently on the outer edge 87 in such a manner that the piston 80 cannot readily slip out of the housing 60. The position of the piston 80 to the effect that the lug-shaped projection 81 projects into the region of the passage opening 64 and is in engagement with the second bar end 32 of the torsion bar 30 is therefore secured by the spring element 61.

If the gas generator 70 is ignited, the gas of the gas generator will flow in the direction of the housing opening 62 in the housing 60 and will press against the piston 80 which is therefore pushed in portions out of the housing opening 62 of the housing 60 in an axial or translatory movement. In the event of such a movement of the piston 80, the lug-shaped projection 81 is moved out of the region of the passage opening 64 such that said projection is disengaged from the torsion bar 30 according to FIG. 1. As a result, the fixing device 50 is deactivated and the flange portion of the second bar end 32 of the outer torsion bar 30 is released, and therefore the outer torsion bar 30 can freely rotate and does not result in any further belt retaining force. The belt retaining force is now determined solely by the inner torsion bar 300.

When the piston 80 is pushed out of the housing 60, the ramp-shaped depression 86 is moved out of the interior of the housing and past the spring element 61, and therefore the spring element 61 will engage in the ramp-shaped depression 86. During the piston movement, the spring element will slide along the gentle flank 86a of the ramp-shaped depression 86 and will brake the movement of the piston 80 because of friction. If the piston 80 comes to a standstill, the steep flank 86b of the ramp-shaped depression 86 blocks a rearward movement of the piston 80 in the direction of the passage opening 64 and therefore a reengagement of the piston 80 in the torsion bar 30.

In order to avoid the gas of the gas generator 70 being able to flow past the piston 80, the piston 80 is preferably sealed; this is shown more specifically by way of example in FIGS. 5 and 6.

FIG. 5 shows a seal 100 which is preferably composed of plastics material or rubber and is attached, for example in an interlocking, frictional and/or integrally bonded manner, along the arrow direction P3 on that piston side 88 of the piston 80 which faces the gas generator 70. In order to permit an interlocking connection between the seal 100 and the piston 80, the piston 80 and the seal 100 are preferably provided with interlocking connection elements and/or latching elements 110.

FIG. 6 shows the piston 80 and the seal 100 after the seal 100 has been fitted onto the piston 80. FIG. 6 shows the piston 80 and the seal 100 in cross section in a cut-open state.

FIG. 7 shows by way of example how the fixing device 50 according to FIGS. 3 and 4 can be provided with the torsion bar 30 according to FIGS. 1 and 2. It can be seen that the first bar end 31 of the torsion bar 30 is plugged through the passage opening 64 in the housing 60 such that the interlocking connection portion or the depression 33 on the second bar end 32 can be brought into contact with the piston 80 of the fixing device 50.

It can furthermore be seen in FIG. 7 that the first bar end 31 can also be provided with an interlocking connection portion in order to permit an interlocking connection with the gearwheel 41 of the gearing 40 according to FIG. 1, for example by pressing thereon.

FIG. 8 shows the torsion bar 30 and the fixing device 50 according to FIG. 7 after the second bar end 32 has been positioned in the passage opening 64 in the housing 60 and the lug-shaped projection 81 of the piston 80 has been pushed into the depression 33 in the second bar end 32. It can be seen that rotation of the second bar end 32 about the longitudinal axis of the torsion bar 32 is prevented by the lug-shaped projection 81. In other words, the second bar end 32 is therefore fixed, and therefore—in particular in the event of a hazardous situation or an accident—the torsion bar 30 can be twisted in order to dissipate energy. The piston 80 leaves its locking position and releases the torsion bar 30 only when the gas generator 70 has been triggered.

After the torsion bar 30 and the piston 80 have been brought into the position shown in FIG. 8, according to FIG. 1 the positioning element 90 can be fitted and the locking pin 91 plugged into the slot-shaped hole 82 of the piston 80. The locking pin 91 together with the spring element 61 prevents it from being possible for the piston 80 to move from the piston locking position shown in FIGS. 1, 2 and 8 into a release position, in which the lug-shaped projection 81 and the depression 33 are disengaged, as long as the gas generator 70 is inactive.

FIG. 9 shows components of a second exemplary embodiment of a belt retractor 10 which is provided with a switchable fixing device having an axially displaceable piston 80. In contrast to the exemplary embodiment according to FIGS. 1 and 8, the second bar end 32 is not provided with a single depression 33, but rather with a toothing 200 in which a complementary toothing 210 of the piston 80 engages.

FIG. 9 shows the switchable fixing device 50 in the locking position of the piston 80, in which the piston 80 keeps the second bar end 32 of the torsion bar 30 rotationally fixed and forces twisting of the torsion bar 30 in the event of an extension of the belt strap caused by an accident or a hazardous situation.

FIG. 10 shows the belt retractor 10 according to FIG. 9 after the gas generator 70 of the fixing device 50 has been released and the piston 80 has been moved along the arrow direction P5 (i.e. in a translatory movement in the axial direction) out of the region of the second bar end 32 of the torsion bar 30. By means of the movement of the piston 80 from the locking position illustrated in FIG. 9 into the release position illustrated in FIG. 10 by axial displacement along the arrow direction P5, the second bar end 32 is released, and therefore the latter can then rotate together with the torsion bar 30 and further twisting of the torsion bar 30 is prevented—even in the event of further rotation of the belt reel 20. Furthermore, the explanations in conjunction with the exemplary embodiment according to FIGS. 1 to 8 apply correspondingly for the exemplary embodiment according to FIGS. 9 and 10.

FIGS. 12 and 13 show a further exemplary embodiment of a fixing device 50 which can be used in the case of the belt retractor 10 according to FIGS. 1 and 2.

FIG. 12 shows the fixing device 50 before the gas generator 70 is triggered, i.e. in a blocking position of the piston 80, in which said piston engages in the bar end 32 of the outer torsion bar 30 and blocks a rotational movement of the bar end 32.

FIG. 13 shows the fixing device 50 after the gas generator 70 is triggered, i.e. in a releasing position of the piston 80, in which said piston releases the bar end 32 of the outer torsion bar 30 and permits a rotational movement of the bar end 32.

It is seen in FIGS. 12 and 13 that the piston 80 has a snap hook 400 which, in the blocking position of the piston 80 according to FIG. 12, is latched into a hole in the housing or housing hole 410 of the housing 60 and keeps the piston 80 in the blocking position by means of an interlocking connection. After the gas generator 70 is triggered and a translatory movement of the piston 80 along the arrow direction P6, the snap connection is released by elastic bending of the snap hook 400.

The snap hook 400 furthermore carries out the function of moving the piston 80 back along the arrow direction P7 in FIG. 13 and therefore preventing reengagement of the piston 80 in the bar end 32 of the torsion bar 30.

An exemplary embodiment of the piston 80 according to FIGS. 12 and 13 is shown more specifically in FIGS. 14 to 16.

It is seen in FIG. 14 that the piston 80 is in two parts and is formed by two parts connected to each other, namely a piston basic body 500 and an insert part 600. The piston basic body 500 is preferably a piston basic body made of plastic, on the piston end of which that faces the gas generator 70 a seal 510, preferably a plastic seal or rubber seal, is integrally formed in one piece.

As FIG. 15 more specifically shows, the piston basic body 500 furthermore has a slot-shaped recess 520 into which the insert part 600 is plugged. The insert part 600 is held in the slot-shaped recess 520 preferably by an interlocking connection, for example a latching connection. The slot-shaped recess 520 extends into the piston basic body 500, to be precise preferably perpendicularly to the translatory sliding movement of the piston basic body 500 after the gas generator 70 is triggered. For the mounting of the insert part 600, the latter is pushed into the slot-shaped recess 520, specifically preferably perpendicularly to the translatory sliding direction of the piston basic body 500. The insert part 600 is preferably a metal insert part.

FIG. 16 shows the insert part 600 more specifically in detail. An interlocking connection portion 610 which is pushed into the slot-shaped recess 520 of the piston basic body 500 can be seen. Furthermore, a locking portion 620, on which a projection 81 is provided for locking the bar end 32, is seen.

The insert part 600 is preferably formed by a one-piece metal plate which is bent over at least once between the interlocking connection portion 610 and the locking portion 620, specifically preferably by an angle of 90°.

In the case of the exemplary embodiment according to FIG. 16, the insert part 600 is bent over a number of times and is in two layers in the region of the projection 81. In other words, the projection 81 is formed by a two-layered sheet metal portion of the insert part 600; the projection 81 is structurally reinforced by the double layer arrangement.

Alternatively, the projection 81 can be structurally reinforced by compression of the locking portion 620, as a result of which a thickening of the material is brought about.

LIST OF REFERENCE SIGNS

10 Belt retractor
20 Belt reel
21 End of the belt reel
22 End of the belt reel
30 Outer torsion bar
31 Bar end
32 Bar end
33 Depression
40 Gearing
41 Gearwheel
42 Gearwheel
50 Fixing device
60 Housing
61 Spring element
62 Housing opening
62a Edge
63 Housing opening
64 Passage opening
70 Gas generator
80 Piston
81 Projection
82 Hole
83 Piston portion
84 Connecting portion
85 Piston portion
86 Depression
86a Flank
86b Flank
87 Edge
88 Piston side
90 Positioning element
91 Locking pin
100 Seal
110 Latching element
200 Toothing
210 Complementary toothing
300 Inner torsion bar
301 End of the inner torsion bar
302 End of the inner torsion bar
310 Locking base
400 Snap hook
410 Housing hole
500 Piston basic body
510 Seal
520 Recess in the piston basic body
600 Insert part
610 Interlocking connection portion
620 Locking portion
P Arrow direction
P1 Arrow direction
P2 Arrow direction
P3 Arrow direction
P5 Arrow direction
P6 Arrow direction
P7 Arrow direction

The invention claimed is:

1. A belt retractor (10) for a seat belt comprising:
a belt reel (20) for winding up and unwinding the seat belt, and
a torsion bar (30) which is arranged outside the belt reel (20) and is connected at one bar end (32) to a switchable fixing device (50), the switchable fixing device (50), in one state, keeping the bar end (32) rotationally fixed and, in another state, permitting rotation of the bar end (32), wherein
the switchable fixing device (50) has a housing (60) and a displaceable piston (80) which, with a piston portion, in a locking position, can secure the bar end (32) against rotation and, in a release position displaced in relation to the locking position, releases the bar end (32),
in an outer piston portion located outside the housing (60) the piston (80) has a slot-like depression or a slot-like hole (82) in which—in the locking position of the piston (80)—a locking pin (91) engages, the locking pin blocking or at least limiting an axial displacement of the piston (80) in the direction of the release position, and
the locking pin (91) is of a size that when the gas generator (70) is activated, the locking pin is sheared off by the piston (80).

2. The belt retractor (10) as claimed in claim 1, wherein the fixing device (50) has a gas generator (70) which, when activated, generates gas and, by means of the gas pressure, moves the piston (80) in an axial manner from the locking position into the release position.

3. The belt retractor (10) as claimed in claim 1, wherein the switchable fixing device (50) housing (60) has an internal gas duct which connects two housing openings (62, 63) in the housing (60) to each other and is rectilinear in portions,
the entire piston (80) or at least an inner piston portion of the piston (80) is guided axially in the rectilinear portion of the gas duct, and
after the gas generator (70) is activated, the gas of the gas generator (70) is conducted in the direction of the piston (80) and the piston (80) is moved exclusively in an axial manner in the rectilinear portion of the gas duct.

4. The belt retractor (10) as claimed in claim 1, wherein the locking pin (91) is integrally formed in a positioning element (90) which resiliently fixes the position of the axis of rotation of the torsion bar (30) in the region of the bar end (32).

5. The belt retractor (10) as claimed in claim 1, wherein a seal (100) which seals the piston (80) in relation to the housing (60) is fitted on that piston side of the piston (80) which faces the gas generator (70).

6. The belt retractor (10) as claimed in claim 1, wherein the bar end (32) has an interlocking connection portion (86) in which a complementary interlocking connection portion (81) of the piston (80) engages in the locking position and from which the complementary interlocking connection portion of the piston (80) is separated in the release position.

7. The belt retractor (10) as claimed in claim 1, wherein the piston (80) is in at least two parts and has at least two parts connected to each other forming one piston basic body (500) and at least one insert part (600).

8. The belt retractor (10) as claimed in claim 7, wherein the piston basic body (500) is composed of plastic and the insert part (600) of metal.

9. The belt retractor (10) as claimed in claim 7, wherein a seal (510), in particular a plastics or rubber seal, is integrally formed in one piece by injection mold on that piston end of the piston basic body (500) which faces the gas generator (70).

10. A belt retractor (10) for a seat belt comprising:
a belt reel (20) for winding up and unwinding the seat belt, and
a torsion bar (30) which is arranged outside the belt reel (20) and is connected at one bar end (32) to a switchable fixing device (50), the switchable fixing device (50), in one state, keeping the bar end (32) rotationally fixed and, in another state, permitting rotation of the bar end (32), wherein
the switchable fixing device (50) has a displaceable piston (80) which, with a piston portion, in a locking position, can secure the bar end (32) against rotation and, in a release position displaced in relation to the locking position, releases the bar end (32), and
the piston (80) has, between the side facing the gas generator (70) and the side facing away from the gas generator (70), in the region of the inner piston portion of the piston (80), a depression (86) in which, after the release position of the piston (80) is reached, a spring element (61) engages such that the return movement of the piston (80) from the release position into the locking position is prevented.

11. The belt retractor (10) as claimed in claim 10, wherein the depression (86) is ramp-shaped and has a steep and a gentle flank (86a, 86b),
the gentle flank (86a) lying closer to the gas generator (70) than the steep flank (86b).

12. A belt retractor (10) for a seat belt comprising:
a belt reel (20) for winding up and unwinding the seat belt, and
a torsion bar (30) which is arranged outside the belt reel (20) and is connected at one bar end (32) to a switchable fixing device (50), the switchable fixing device (50), in one state, keeping the bar end (32) rotationally fixed and, in another state, permitting rotation of the bar end (32), wherein
the switchable fixing device (50) has a displaceable piston (80) which, with a piston portion, in a locking position, can secure the bar end (32) against rotation and, in a release position displaced in relation to the locking position, releases the bar end (32), and
a spring element (61) is attached or is integrally formed in one piece to or on or in the housing (60), said spring element blocking or at least impeding a displacement of the piston (80) in the axial direction from the locking position into the release position before the gas generator (70) is activated.

13. A belt retractor (10) for a seat belt comprising
a belt reel (20) for winding up and unwinding the seat belt, and
a torsion bar (30) which is arranged outside the belt reel (20) and is connected at one bar end (32) to a switchable fixing device (50), the switchable fixing device (50), in one state, keeping the bar end (32) rotationally fixed and, in another state, permitting rotation of the bar end (32), wherein
the switchable fixing device (50) has a housing (60) and a displaceable piston (80) which, with a piston portion, in a locking position, can secure the bar end (32) against rotation and, in a release position displaced in relation to the locking position, releases the bar end (32),
the housing (60) has a housing opening (62) through which, when the gas generator (70) is activated, the piston (80) or at least the inner piston portion is at least partially pushed axially out of the housing (60), and
a deformable edge portion of the housing (60) is arranged in the region of the housing opening (62), said edge portion projecting into the housing opening, operating as a spring element (61) and blocking or impeding a displacement of the piston (80) in the axial direction from the locking position into the release position before the gas generator (70) is activated and, after movement of the piston (80), preventing a return movement.

14. A belt retractor (10) for a seat belt comprising:
a belt reel (20) for winding up and unwinding the seat belt, and
a torsion bar (30) which is arranged outside the belt reel (20) and is connected at one bar end (32) to a switchable fixing device (50), the switchable fixing device (50), in one state, keeping the bar end (32) rotationally fixed and, in another state, permitting rotation of the bar end (32), wherein
the switchable fixing device (50) has a displaceable piston (80) which, with a piston portion, in a locking position, can secure the bar end (32) against rotation and, in a release position displaced in relation to the locking position, releases the bar end (32),
the piston (80) has a snap hook (400) which, in the position of the piston (80) blocking the torsion bar (30) such that before the gas generator (70) is triggered, is latched in a housing hole (410) in the housing (60) and,
after the gas generator (70) is triggered, prevents the piston (80) from moving back from the position of the piston (80) releasing the torsion bar (30) into the blocking position.

* * * * *